July 28, 1970        D. R. OGLE        3,521,843
CABLE SUPPORTING RACK
Filed March 22, 1968        3 Sheets-Sheet 1
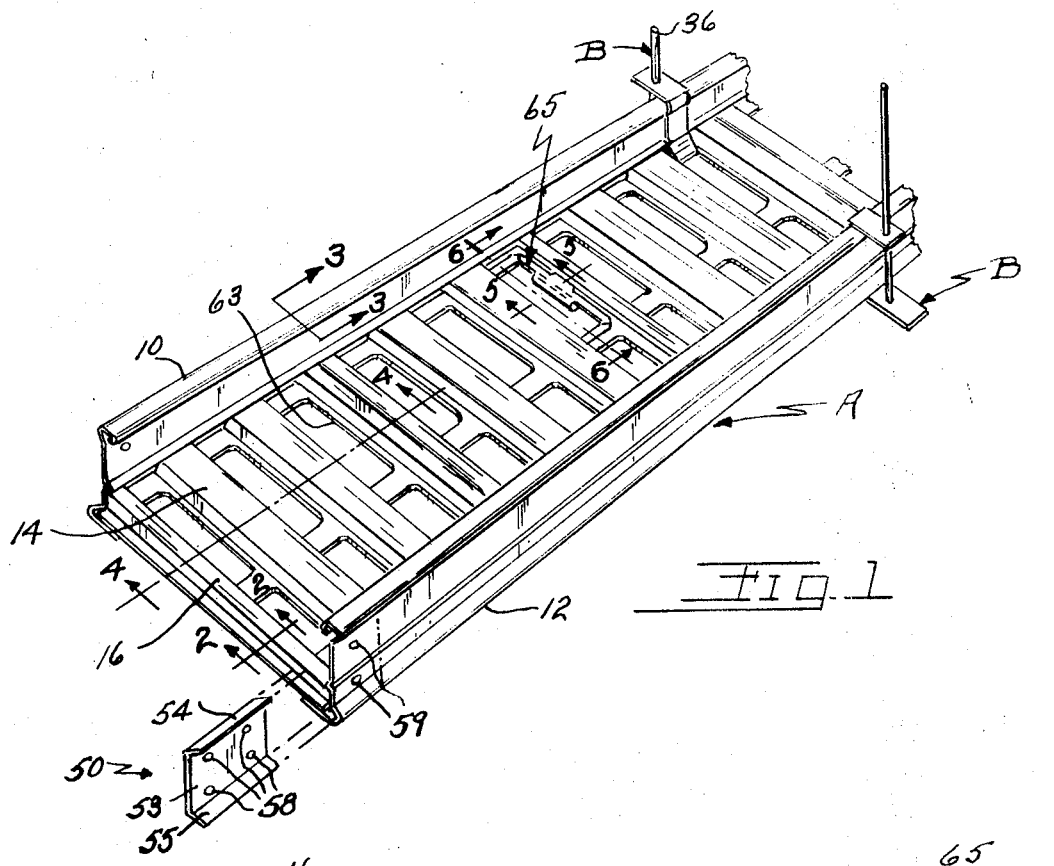
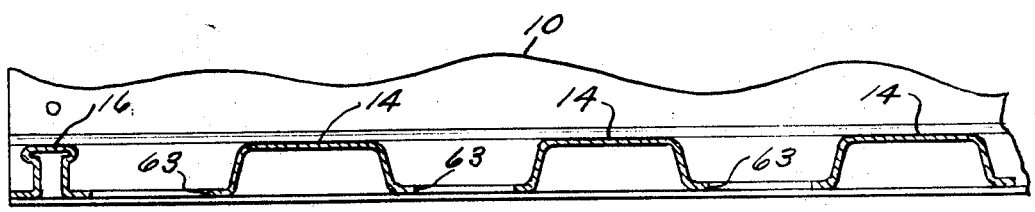
INVENTOR.
DELBERT R. OGLE
BY
Baldwin, Egan, Walling & Fetzer
ATTORNY

INVENTOR
DELBERT R. OGLE

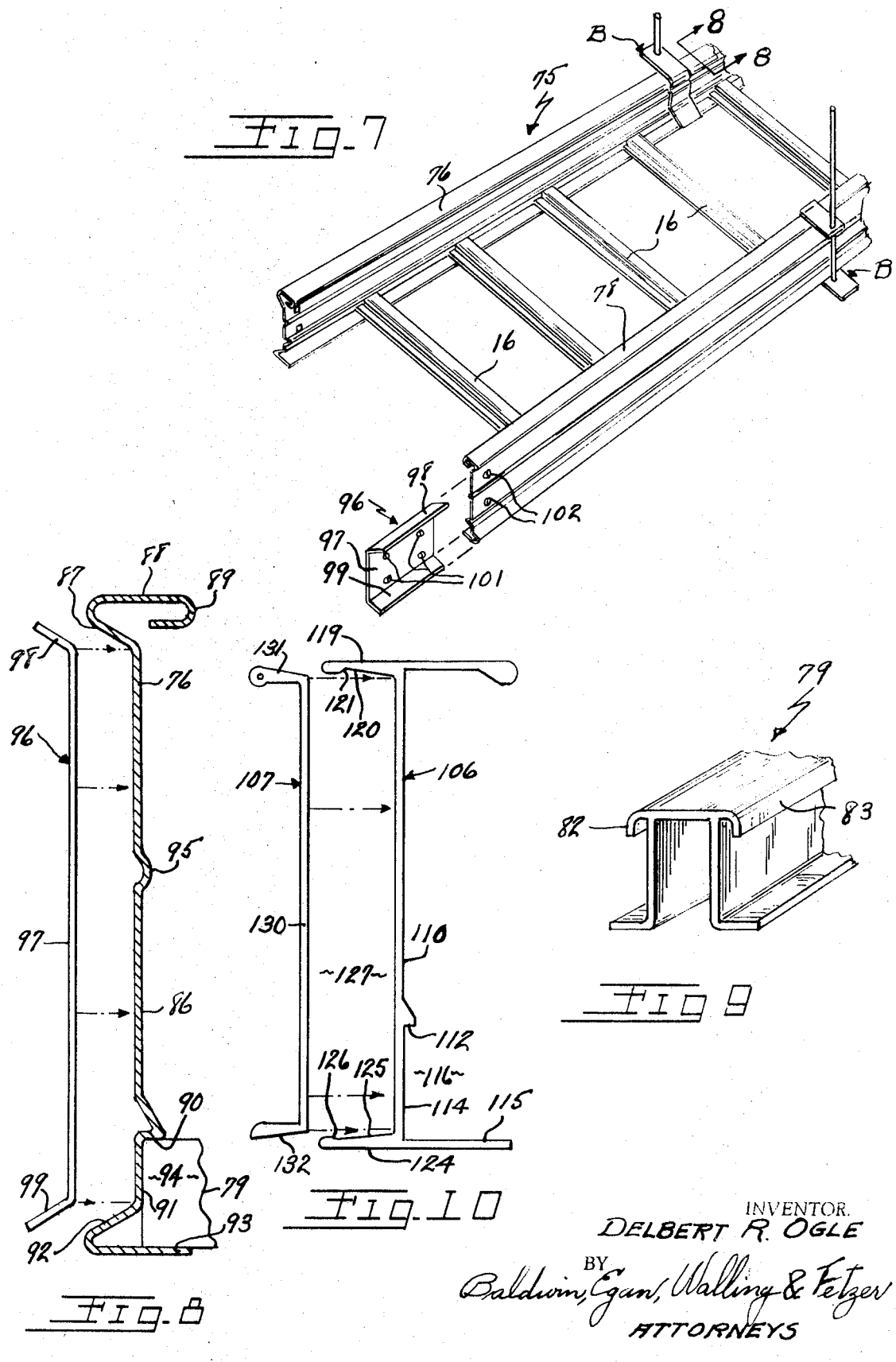

United States Patent Office 3,521,843
Patented July 28, 1970

3,521,843
CABLE SUPPORTING RACK
Delbert R. Ogle, 400 Deanview Drive,
Cincinnati, Ohio 45224
Filed Mar. 22, 1968, Ser. No. 715,211
Int. Cl. F16l 3/22
U.S. Cl. 248—58                    6 Claims

ABSTRACT OF THE DISCLOSURE

A cable supporting trough including a pair of parallel side rails and a cable supporting floor disposed between and interconnecting the side rails. The side rails are configured to confine the floor with a tight fit therein. The floor includes transverse rails having the upper londitudinal edges thereof rolled over to provide substantially increased resistance to lateral buckling. Splice plates are provided to connect end-to-end disposed side rails with the rails being configured to receive the splice plates with a snap fit in one construction, and with a snug wedge fit in another construction. The floor contains apertures through which cables may be passed, with certain of such apertures being lined with removable resilient bushings for preventing fraying of the insulation of cables passing therethrough. The rack may be suspended from a ceiling or wall by suitable hanger fixtures, each including a C-shaped bracket which embraces the side rail and follows the general contour of the inner side of the rail to effect a snug clamping fit therewith.

---

This invention relates to supporting troughs and more particularly to ceiling suspended or wall mounted troughs or racks for supporting cable, conduit, pipe, and the like.

Cable and pipe supporting trough systems are extensively used in power stations and industrial plants to support a plurality of cables or wires for the transmission of electrical energy and for the support of piping or tubing used in the transmission of fluids. A typical trough section includes a pair of spaced parallel side rails and a floor or bottom disposed between and connecting the rails. Such troughs contain many undesirable structural characteristics which render them highly unsatisfactory.

For example, connecting one trough section to another has always been a difficult and cumbersome operation and the structural strength of the resultant joint has not been adequate for both normal and adverse operating conditions. Prior methods of connecting side rails to the trough flooring have also been difficult and cumbersome and needlessly time-consuming. Previous hanger fixtures for supporting the trough from a ceiling do not clamp the side rails firmly. Also, cables passing through apertures in the floor of the trough have their insulation frayed and torn off on the sides of the aperture. In fact, some structures have no apertures at all, thus necessitating chopping a hole in the trough floor and installing an expensive dropout bushing or fitting.

Therefore it is an object of the invention to provide a cable trough which is substantially stronger than prior art units described.

A further object of the invention is to provide a cable trough wherein the flooring may be quickly and easily inserted in the rails to provide a secure joint of high structural strength.

A further object of the invention is to provide a cable trough wherein the joints between trough sections are of substantially increased strength and are most simple to fabricate.

A further object of the invention is to provide a cable trough having hanger fixtures that embrace the side rails with a snug, tight fit.

A further object of the invention is to provide a cable trough wherein the insulation on cables passing through apertures in the trough flooring cannot become frayed or torn.

A further object of the invention is to provide a new and novel cable trough that is simple in construction, inexpensive to manufacture, and highly effective in operation.

Briefly the foregoing objects are accomplished by the provision of a cable supporting rack including a pair of parallel, spaced, longitudinal side rails, and a cable supporting floor disposed between and interconnecting the side rails. The side rails are configured to receive or confine the floor with a firm tight fit therein. The floor is formed in longitudinal sections and may include transverse rails at the ends of such sections, such rails having the upper longitudinal edges thereof rolled over to provide substantially increased resistance to lateral buckling. Splice plates are provided to connect end-to-end disposed side rails, such rails being configured to receive the splice plates on the outer side of the rails with a secure, snug, clamping fit. The floor is reticulate and contains apertures, with certain or all of such apertures being adapted to receive cables or conduit therethrough, said certain apertures being lined with snap-fitted, removable, resilient, bushings or liners for preventing fraying of the insulation of such cables or conduit passing therethrough. The rack may be suspended from a wall or ceiling by hanger fixtures each including a C-shaped bracket which embraces the rail and follows the general contour of the inner side of the rail to effect a tight, snug, clamping fit therewith. Such bracket not only supports the side rail, but lends rigidity to the totally installed cable tray.

Thus, there is provided an unusually strong cable rack that may be quickly and easily assembled. On the site it is raised to suspended position below a ceiling, for example, and secured thereto with easily-applied, high-strength, hanger fixtures.

Other objects and advantages of the invention will be apparent from the following description taken in conjunction with the drawings wherein:

FIG. 1 is a perspective view of a cable rack of the invention and showing the relative position of a side rail splice plate prior to assembly;

FIG. 2 is an enlarged broken perspective view taken along the line 2—2 of FIG. 1;

FIG. 4 is an enlarged view taken along the line 4—4 of FIG. 1;

FIG. 5 is an enlarged view taken along the line 5—5 of FIG. 1;

FIG. 6 is an enlarged view taken along the line 6—6 of FIG. 1;

FIG. 7 is a perspective view of a modified cable rack of the invention and showing a splice plate in relative position prior to assembly;

FIG. 8 is an enlarged view taken along the line 8—8 of FIG. 7 and, in addition, showing a splice plate in relative position prior to assembly;

FIG. 9 is an enlarged broken perspective view of one form of ladder rung which may be used in ladder type troughs; and FIG. 10 is an end elevational view of a modified form of side rail and its coacting splice plate.

Figure 3:
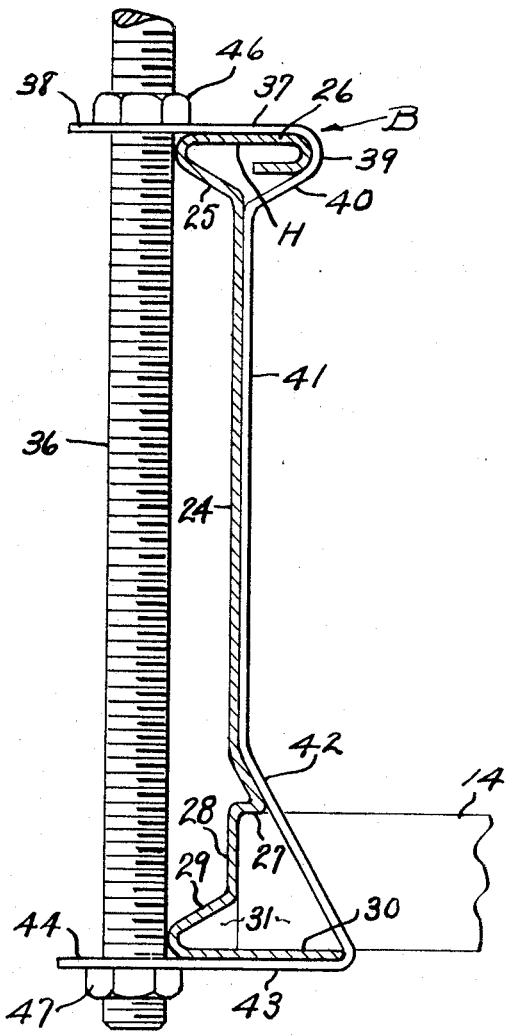
FIG. 3 is an enlarged view taken along the line 3—3 of FIG. 1.

Although the invention is shown and described herein with respect to carrying cables, it will be understood that it may be used to support any type of elongated object in suspended position.

Referring first to FIG. 1, there is shown a cable supporting rack or trough of the invention, generally designated as A, and including a pair of elongated, parallel, spaced-apart, longitudinal side rails 10 and 12, and a reticulate cable supporting floor means or corrugated bottom 14 disposed between and interconnecting the side rails. The corrugations of the floor 14 are preferably of one inch depth to permit use of at least twenty-four gauge material.

The floor 14 includes a transverse end rail or cross rung 16 connecting the side rails 10 and 12, said end rail having a generally I-shaped configuration (FIG. 2) in cross-section, with the top transverse portion of the I having its outer edges 18 and 20 rolled over or curved downwardly and thence inwardly to provide increased resistance to lateral buckling. The rails 16 may be welded to the side rails to provide increased rigidity to the trough and thus constitute a reinforcing member for the total structure. The rails or rungs 16 also function to prevent damage to the light gauge corrugated floor 14 during shipment and subsequent handling. For example, tray floors are sometimes damaged when they are accidentally bumped into a piece of supporting steel during installation. End rungs 16 prevent such damage. Additionally, the end rails 16 constitute reinforcing members in each end of the cable trough trays that give protection to the trough floor.

Each of the side rails 10 and 12 includes a vertically disposed longitudinal side wall 24 (FIG. 3). The upper portion of such side wall extends outwardly and upwardly of the trough A forming a downwardly and outwardly facing abutment 25, thence inwardly beyond the side wall 24 to form a flat top portion 26, and thence downwardly forming an inverted top hook or hook portion, generally designated as H, such construction providing unusually high strength and rigidity to the side rail. The lower portion of the side wall 24 first extends downwardly and inwardly of the rack thence directly outwardly forming a horizontal shoulder or ridge 27, thence downwardly forming a vertical wall 28, thence downwardly and outwardly forming an upwardly and outwardly facing lower abutment 29, thence inwardly forming a flat base portion 30. The shoulder 27, the vertical wall 28, and the flat base portion 30 define an inwardly facing cavity 31 for receiving or confining the outer edge portion of the floor 14 or rails 16 with a tight fit therein. With this construction, the trough A may be very easily and quickly assembled by simply inserting the floor 14 into the cavity 31 of the side rails 10 and 12 thereby confining the side edges of the floor 14 between the side rails. On the site, such completed rack A is raised to final suspended position where it may be secured in a manner now to be described. Thus, the corrugated floor 14 is trapped under the ridge 27 along the side rail and cannot be torn loose.

The rack A is retained in operative suspended position from a ceiling, for example, by a plurality of hanger fixtures in the form of C-shaped brackets B embracing the side rails with a snug fit. An elongated mounting rod 36 (FIG. 3) passes through the bracket and is secured to an associated building ceiling (not shown). The bracket includes a top section 37 positioned over the top portion 26 of the side rail 10 and extends at one end outwardly beyond the rail to form an outwardly overhanging top flange portion 38 for receiving the rod 36 therethrough. At its inner end the section 37 extends downwardly (as at 39) and by the inverted top hook portion H of the rail 10, thence downwardly and outwardly (as at 40) to the rail side wall 24, thence downwardly (as at 41) along the rail 24, thence downwardly and inwardly (as at 42) to the bottom of the rail, thence around the bottom of the rail, and thence outwardly along the bottom of the rail (as at 43) and outwardly beyond the rail to form an outwardly overhanging bottom flange portion 44. The top and bottom flange portions 38 and 44 have vertically aligned apertures for receiving the mounting rod 36 in mounting relation therethrough. The rod 36 is rigidly secured to the bracket B by the nuts 46 and 47. Thus, the bracket B follows the general contour of the inner side of the rail 10 and embraces the same with a tight, snug, clamping or snap fit. Other methods of support may be employed such as trapeze type supports, wall brackets, etc.

Splice plates, generally designated as 50 (FIG. 1), are provided for longitudinally joining end-to-end disposed side rails on the outer sides thereof. Each plate 50 includes a flat vertical wall 53 having an upper edge portion 54 extending outwardly and upwardly, and having a lower edge portion 55 extending directly outwardly and downwardly. The plate 50 is adapted for placement over the joint of two end-to-end, longitudinally disposed, side rails. With this construction, the splice plate upper edge portion 54 abuts against the side rail abutment 25, the plate vertical wall 53 abuts the outer side of the rail side wall 24, and the plate lower edge portion 55 abuts or rests on the rail shelf 29 of the respective adjacent side rails, thus providing a snug, high-strength, side rail joint. The splice plate vertical wall 53 and the adjacent rail side wall(s) 24 have aligned bolt holes 58, 59, respectively, for receiving associated bolts (not shown) therethrough to secure the side rail joint with a snug wedge fit. The tighter the bolts are tightened the stronger the resulting joint. Thus, such wedge-lock splice plate results in a stronger joint than is provided by a simple flat plate or even a square cornered channel shaped splice plate.

The rack floor 14 contains a plurality of apertures 63 for ventilation purposes, for reducing the floor weight, and for passing cables therethrough. To prevent fraying of insulation of cables, such apertures may be lined with unique, removable, snap-fitting resilient bushings, generally designated as 65 (FIGS. 1, 5 and 6). The bushings each comprise a continuous, endless, resilient member dimensioned to snap into the periphery of the aperture with a releasable, snap fit. In the present instance, the bushing is rectangular and is semi-hemispherical in cross-sectional configuration with the flat underside 67 of the bushing resting on the floor 14 around the periphery of the aperture 63. The inner portions of the bushing have downwardly extending flanges 69 (FIG. 6) for abutting the respective adjacent edges of the aperture 63. Additionally, the bushing also has on its longitudinal side portions the downwardly extending, elongated, longitudinal, abutments 70 having longitudinal slots 71 (FIG. 5) engaging the respective sides of the aperture 63, such abutments 70 and the flanges 69 retaining the resilient bushing 65 securely in the aperture with a snap fit. Elongated handles or flanges 72 may be provided on the bushing 65 to facilitate grasping the same. With this construction, the bushing 65 may be quickly and simply placed in any of the apertures 63 through which a cable may be inserted.

Referring now to FIG. 7, there is shown a modified cable rack 75 of the invention in the form of a pair of modified spaced, parallel, longitudinal, side rails 76, 78, and a cable supporting floor means disposed therebetween in the form of a plurality of spaced, cable supporting rungs 16 interconnecting the side rails.

FIG. 9 shows a rung 79 which is a modification of the rung 16. The rung 79 (FIG. 9) has a generally I-shaped configuration in cross-section with the top transverse portion of the I having downwardly curved, bulbed, rolled over outer edges or flanges 82 and 83 to provide increased resistance to lateral buckling.

Each of said side rails in the FIG. 7 structure includes a vertically disposed longitudinal side wall 86 (FIG. 8) with the upper portion of such side wall extending outwardly and upwardly of the rack forming a downwardly and outwardly facing upper abutment 87, thence extending inwardly beyond the side wall to form a flat top portion 88, and thence downwardly and inwardly forming an inverted top hook portion 89 to provide rigidity to the rail. The lower portion of the side wall 86 first extends downwardly and inwardly of the rack thence directly outwardly forming a horizontal shoulder 90, thence downwardly forming a vertical wall 91, thence downwardly and outwardly forming an upwardly and outwardly facing lower abutment 92, thence inwardly forming a flat base portion 93. The shoulder 90, the vertical wall 91, and the flat base portion 93 define an inwardly facing cavity 94 for receiving an outer edge portion of the floor means or rungs 79 with a releasable snap fit therein. A longitudinal stiffening rib 95 may be provided in the rail side wall 86 to provide additional structural strength to the same.

Splice plates 96 are provided for longitudinally joining end-to-end disposed side rails of FIG. 7 on the outer sides thereof. Each of said splice plates includes a flat vertical wall 97 having its upper edge portion 98 extending outwardly and upwardly, and having its lower edge portion 99 extending outwardly and downwardly. The splice plate 96 is adapted for placement over the joint of two longitudinally-adjacent end-to-end disposed side rails, such that the splice plate upper edge portion 98 abuts against the upper abutment 87 of each respective side rail, the splice plate vertical wall 97 abuts the side walls 86 of the rails, and the splice plate lower edge portion 99 abuts against said lower abutment 92 of each of the respective side rails. The splice plate vertical wall 97 and the adjacent rail side walls 86 having aligned bolt-holes 101, 102, respectively, therein, as best shown in FIG. 7, for receiving associated bolts therethrough to secure the joint with a snug, wedge fit.

FIG. 10 illustrates a further modification of the invention in the form of the side rail 106, and its coacting splice plate 107. The rail 106 includes a vertically disposed longitudinal side wall 110 with the lower portion of such side wall first extending downwardly and inwardly of the rack thence directly outwardly forming a horizontal downwardly facing shoulder 112, thence extends downwardly forming a vertical wall 114, thence inwardly forming a flat base portion 115. The shoulder 112, the vertical wall 114, and the base portion 115 define an inwardly facing cavity 116 for receiving an outer edge portion of the floor 14 or 79 with a tight, confining fit therein.

In effect, the side rail 106 has a generally I-shaped configuration in cross-section with the main vertical stem of the I forming the vertical side wall 110. The lower surface of the outer section 119 of the top transverse portion of the I first extends outwardly and slightly upwardly forming a top wall 120, thence downwardly to form an upper abutment 121, and thence outwardly to the end of the section 119. The upper surface of the outer section 124 of the lower transverse portion of the I extends outwardly and slightly downwardly forming a bottom wall 125, thence upwardly to form a lower abutment 126, thence outwardly. The side wall 110, the top and bottom walls 120, 125, and the abutments 121, 126, all form a cavity 127 for receiving the splice plate 107 therein with a wedge-lock fit.

The spice plate 107 includes a flat vertical wall 130 having its upper edge portion 131 extending outwardly and slightly upwardly and having its lower edge portion 132 extending outwardly and slightly downwardly. The splice plate 107 is adapted for placement over the joint of two longitudinally adjacent side rails 106, whereby the splice plate is received in the respective cavity 127 of each rail such that the splice plate upper outer edge portion 131 abuts against the upper abutment 121 of each rail, said splice plate vertical wall 130 abuts the side wall 110 of each rail, and said splice plate lower outer edge portion 132 abuts the lower abutment 126 of each of the respective side rails to snap-lock the plate in locking position therein. The splice plate vertical wall 130 and the adjacent rail side walls 110 may have aligned bolt-holes therein for receiving associated bolts therethrough to secure the joint.

It will be understood that the cable supporting troughs disclosed herein may be formed of any suitable material. However, in the FIGS. 2, 3, and 8 structures, steel has been found to be particularly satisfactory and in the FIGS. 9 and 10 structures aluminum is preferred.

Thus there is provided a cable rack of unusually strong construction that may be very quickly and easily placed in operative suspended position.

It will be understood that the invention may be provided with a complete selection of horizontal and vertical bends, T's, crosses, and reducers to effect a complete system. Accordingly, the cable trays of the invention may therefore be routed throughout the facility without interruption.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A cable supporting rack comprising; a pair of elongated, parallel, spaced-apart, longitudinal, side rails; and a cable supporting floor disposed between and interconnecting said side rails; each of said side rails including a vertically disposed longitudinal side wall with the upper portion of such side wall extending outwardly and upwardly of the rack forming a downwardly and outwardly facing abutment, thence inwardly beyond the side wall to form a flat top portion, and thence downwardly forming an inverted top hook portion to provide rigidity to the rail; the lower portion of the side wall first extending downwardly and inwardly of the rack forming a horizontal shoulder, thence downwardly forming a vertical wall, thence downwardly and outwardly forming an upwardly facing lower abutment, and thence inwardly forming a flat base portion, said shoulder, vertical wall, and base portion defining an inwardly facing cavity for receiving an outer edge portion of the floor with a tight fit therein.

2. The structure of claim 1 and further including a plurality of hanger fixtures for suspending the rack from an associated building ceiling, each of said fixtures comprising: a generally C-shaped bracket embracing the side rail, and an elongated rod connecting the bracket to such ceiling; said bracket including a top section positioned over said flat top portion of the side rail and extending at one end outwardly beyond the rail to form an outwardly overhanging top flange portion, said section extending at its inner end downwardly and by said inverted top hook portion of the rail, thence downwardly and outwardly to the rail side wall, thence downwardly along said rail side wall, thence downwardly and inwardly, thence around the bottom of the rail, and thence outwardly along the bottom of the rail and outwardly beyond the same to form thereat an outwardly overhanging bottom flange portion, said top and bottom flange portions having vertically aligned apertures therein for receiving said rod in mounting relation therethrough, said bracket following the general contour of the inner side of the rail and embracing the same with a tight, snug, clamping fit.

3. The structure of claim 1 and further including splice plates for longitudinally joining end-to-end disposed side rails on the outer sides thereof, each of said splice plates comprising: a flat vertical wall having its upper edge portion extending outwardly and upwardly and having its lower edge portion extending outwardly and downwardly, said splice plate being adapted for placement over the joint of two longitudinally adjacent side rails whereby the splice plate upper edge portion abuts against said rail abutment, said splice plate vertical wall abuts the side walls of the rails, and said splice plate lower edge portion abutting the rail lower abutment, of each of the respective side rails; said splice plate vertical wall and the adjacent rail side walls having aligned bolt-holes therein for receiving associated bolts therethrough to secure the joint.

4. A cable-supporting rack comprising: a pair of elongated, parallel, spaced-apart, longitudinal, side rails; and a cable supporting floor means disposed between and interconnecting said side rails; each of said side rails having a generally I-shaped configuration in cross-section with the main vertical item of the I forming a vertical side wall and with the lower surface of the outer section of the top transverse portion of the I first extending outwardly and slightly upwardly forming a top wall, thence downwardly to form an upper abutment, and thence outwardly to the end of the section; the upper surface of the outer section of the lower transverse portion of the I extending outwardly and slightly downwardly forming a bottom wall, thence upwardly to form a lower abutment, thence outwardly; said side wall, said top and bottom walls, and said abutments all forming a cavity for receiving an associated splice plate therein with a snap fit.

5. The structure of claim 4 and further including splice plates for longitudinally joining end-to-end disposed side rails on the outer sides thereof, each of said splice plates comprising; a flat vertical wall having its upper edge portion extending outwardly and upwardly and having its lower edge portion extending outwardly and downwardly; said splice plate being adapted for placement over the joint of two longitudinally adjacent side rails whereby the splice plate is received in the respective cavity of each rail such that the splice plate upper outer edge portion abuts against said upper abutment of each rail, said splice plate vertical wall abuts the side wall of each rail, and said splice plate lower outer edge portion abuts the lower abutment of each of the respective side rails; said splice plate vertical wall and the adjacent rail side walls having aligned bolt-holes therein for receiving associated bolts therethrough to secure the joint with a wedge fit.

6. A cable supporting rack comprising; a pair of elongated, parallel, spaced-apart, longitudinal, side rails; splice plates for longitudinally joining end-to-end disposed side rails; a cable supporting floor means disposed between and interconnecting said side rails; said floor means containing a plurality of apertures for inserting certain associated cables therethrough; each of said side rails including a vertically disposed longitudinal side wall with the lower portion of such side wall having an inwardly facing cavity for receiving the outer edge portion of the floor means therein with a snap fit; the outer side portion of the rails being configured to receive the splice plates in snug relation therein; said floor means including a transverse rail connecting said side rails and having a generally I-shaped configuration in cross-section with the top transverse portion of the I having downwardly curved, rolled-over, outer edges to provide increased resistance to lateral buckling; certain of said apertures being lined with removable resilient bushings for preventing fraying of the insulation on cables passing through such apertures; each of said bushings comprising a continuous endless resilient member dimensioned to snap into the periphery of the aperture with a snap fit; and a plurality of hanger fixtures for suspending the rack from an associated building ceiling, each of said fixtures comprising; a generally C-shaped bracket embracing the side rail, and an elongated rod connecting the bracket to such ceiling, said bracket following the general contour of the inner side of the rail and embracing the same with a clamping fit.

References Cited

UNITED STATES PATENTS

| 1731,611 | 10/1929 | Clark | 182—228 X |
| 2,656,998 | 10/1953 | Ullberg | 248—68 |
| 2,728,957 | 1/1956 | Keller | 52—495 X |
| 2,905,416 | 9/1959 | Wiegand | 248—58 |
| 3,022,972 | 2/1962 | Bunston | 248—68 |
| 3,035,800 | 5/1962 | McLeod | 248—68 |
| 3,137,468 | 6/1964 | Meinders | 248—68 X |
| 3,372,441 | 3/1968 | Fischer | 16—2 |

FOREIGN PATENTS 849,761  9/1960  Great Britain.

CHANCELLOR E. HARRIS, Primary Examiner

U.S. Cl. X.R.

174—68; 248—68